Patented Aug. 26, 1947

2,426,172

UNITED STATES PATENT OFFICE 2,426,172

FLUORINATION OF UNSATURATED COMPOUNDS

Anthony F. Benning, Woodstown, N. J., assignor to Kinetic Chemicals, Inc., Wilmington, Del., a corporation of Delaware No Drawing. Application May 12, 1942, Serial No. 442,662

3 Claims. (Cl. 260—653)

A. This invention relates to the preparation of fluorine compounds and has particular relation to the fluorination of unsaturated aliphatic and unsaturated carbocyclic hydrocarbons.

B. An object of this invention is to prepare certain fluorinated compounds by a process having advantages over those which are known to the prior art. A particular object of the invention is to prepare the compound $C_2F_6$ and $C_2F_5Cl$. Another object of the invention is to add at least two fluorine atoms to an unsaturated organic compound by a simple method. Another object of the invention is to prepare organic fluorine compounds, which could previously be obtained only by the reaction of elemental fluorine, by a simpler and better process. Another object of the invention is to prepare compounds which cannot be obtained at all or can be obtained only with difficulty by prior art methods. Other objects of the invention will be in part apparent and in part hereinafter set forth.

C. The objects of the invention are accomplished, generally speaking, by reacting unsaturated hydrocarbons, which may contain substituent groups, with antimony pentafluoride. The reaction may be carried out in the vapor phase or in the liquid phase and the temperature at which the optimum reaction occurs differs with the particular compound being acted upon. The temperature used should be chosen to give the maximum yield of the desired product. The pressures used are also to be selected according to the products which are in reaction. When a vapor phase reaction is used, the vapors of the organic material are preferably passed through liquid antimony pentafluoride, but may be simply passed over the surface of it. The hydrocarbon vapors may be preheated or precooled before admitting them to the reaction chamber, the treatment depending upon the question of efficiency of reaction.

D. The reaction tube may be made out of any material which is substantially inert to the reactants and the products. A very wide selection of materials is suitable, for example, copper, brass, silver and platinum.

E. After the reaction is completed, the reaction products are separated by any method which accomplishes it. A satisfactory method of separating products from reactants is to react the un-reacted starting materials with elemental bromine and separate the products of reaction therefrom by distillation. Other methods of separation may be adopted within the skill of the art.

F. The temperatures of reaction are capable of greatest variation. For example, temperatures from —20 and +125 have been successfully used. If the process is carried out in liquid phase, the liquefaction may be obtained by dissolving the unsaturated compound in a suitable solvent or by liquefying the olefine under pressure.

G. The following examples illustrate the invention. They do not limit it. Unless otherwise specified, the examples were run at one atmosphere pressure and the parts are by weight.

*Example I*

Forty-two parts of essentially dry $C_2F_4$ (B. P. —76°) were passed through 59 parts of $SbF_5$ in a brass reaction chamber during the course of four hours. The reaction was first carried out at about atmospheric pressure then gradually lowered to about 50 mm. Hg pressure, while the temperature varied over the range 25° to 98° C.

Approximately 9.2 parts of material were condensed and 25 parts of a mixture of $C_2F_4$ and $C_2F_6$ were collected over water.

The products were all transferred to one gas receiver and treated with an excess of bromine in order to convert the unreacted $C_2F_4$ to $C_2F_4Br_2$. The mixture was allowed to stand in sunlight and the excess bromine then removed by sodium sulfite solution.

The organic material was fractionated, most of the material distilling at about —79° C. After further purification the vapor density of the gas was found to be 1.673 g./l. at 26.6° C. and 230 mm. Hg pressure. This is equivalent to a molecular weight of 136.2 as compared to a theoretical value of 138 for $C_2F_6$. A boiling point of —78.2° C. is reported in the literature for $C_2F_6$. (Ruff, Z. für anorg. und allg. Chemie, 210, 180 (1933).)

*Example II*

About 41 parts of $C_2F_3Cl$ (B. P. —28°) was treated with 60 parts of $SbF_5$ in a manner similar to that used in Example I. The reaction was carried out at a temperature of about 95° C. and at a pressure varying from 500-700 mm. Hg absolute.

The condensed reaction products were first purged free of air and fractionated. Most of the material distilled at about —37° C. (uncorr.). Bromine treatment was used to remove small traces of unreacted $C_2F_3Cl$ and the organic material refractionated to obtain pure $C_2F_5Cl$ with a boiling point of —37° C. Literature gives —38° C. as the boiling point of $C_2F_5Cl$ (Henne, Jour. Am. Chem. Soc. 56, 1726 (1934)).

*Example III*

Acetylene dried by passage through concentrated sulfuric acid was bubbled slowly through $SbF_5$ contained in a steel cylinder. The reaction was carried out at room temperature. The effluent gases were then washed free of acid, dried and fractionated. Material boiling at —64° C. at 360 mm. Hg pressure was obtained which extrapolated to −52° C. at 760 mm. pressure, the boiling point of $CHF=CF_2$. A molecular weight of 88 was obtained for this material. The theory for pure $CHF=CF_2$, 82.

*Example IV*

About 5.5 parts of $C_2Cl_4$ (B. P. 121°) were slowly added to about 2.5 parts of $SbF_5$ in a platinum-lined tube and the reaction allowed to proceed at room temperature for about 10–15 minutes. The reaction products were washed free of acid, dried and distilled. A product with a distillation range of 85–120° C. was obtained, having a definite fraction at 92–93° C. Addition of two atoms of F to $C_2Cl_4$ took place. The boiling point of $CCl_2F-CCl_2F$ is 92.8° C.

*Example V*

Five parts of $C_2HCl_3$ were added to two parts of $SbF_5$ and allowed to react as in Example IV. The reaction mixture was washed with dilute hydrochloric acid, dried and distilled. A product with a boiling range of 71°–90° was obtained, having a definite cut at 72°–73° C. The boiling point of $C_2HCl_3F_2$ is 72.5° C. Addition of two atoms of fluorine to $C_2HCl_3$ took place.

*Example VI*

About nine parts of alpha-pinene, $C_{10}H_{16}$ (B. P. 154° C.), were added to five parts of $SbF_5$ in a platinum-lined tube. A violent reaction took place at room temperature. More pinene was added to lessen the violence of the reaction. After washing and drying the reaction mixture was distilled. The product had a boiling range of 90°–158° C. The fraction boiling at 90°–105° C. upon analysis was found to contain fluorine.

*Example VII*

About nine parts of styrene, $C_6H_5C_2H_3$ (B. P. 146°), were added to two parts of $SbF_5$ in a platinum dish. The washed and dried liquid reaction products upon distillation showed a boiling range of 80–145° C. This material was found upon analysis to contain fluorine.

*Example VIII*

Six parts of 1,3-dichlorobutene-2, $C_4H_6Cl_2$ (B. P. 128° C.) cooled to 0° C. were added to two parts of $SbF_5$ in a platinum-lined tube. The reaction was carried out at 0° C. The reaction mixture was treated with dilute hydrochloric acid, washed free of acid, dried and distilled. A product with a boiling range of 75°–148° C. was obtained.

*Example IX*

Fourt parts of hexene-3

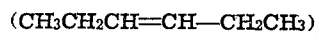
$(CH_3CH_2CH=CH-CH_2CH_3)$ (B. P. 70° C.) were added to three parts of $SbF_5$ cooled to 0° C. The reaction product was washed with HCl and water, washed free of acid, dried and distilled. A fraction boiling in the range 55° to 175° C. was obtained, as well as a tarry residue.

*Example X*

About four parts of cyclohexene (B. P. 83° C.) were added to two parts of $SbF_5$ cooled to 0° C. in a platinum-lined reaction tube. The product was treated as in Example IX and distilled. A product with a boiling range of 35°–85° C. was obtained.

*Example XI*

About eight parts of camphene (B. P. 159° C.) were added in liquid phase to three parts of $SbF_5$. A rapid reaction took place with the formation of some tar. The liquid product was washed, dried and distilled. A product with a boiling range of 70°–165° C. was obtained.

*Example XII*

Eight parts of dihydronaphthalene (B. P. 212° C.) were added to three parts of $SbF_5$. The reaction mixture was extracted with benzene, washed with dilute HCl solution, washed free of acid, dried and distilled. A boiling range of 50° to 220° C. was obtained for the product, slight decomposition occurring at about 200° C.

H. This invention provides a new method of fluorination and a new reaction. It has a tendency to introduce fluorine symmetrically and to make possible the synthesis of compounds whose synthesis was heretofore considered difficult. The reaction is easily controlled and permits the synthesis of highly fluorinated compounds which were previously obtainable only by the use of elementary fluorine. In particular it provides a new and more efficient method of making the useful compounds $C_2F_5Cl$ and $C_2F_6$.

I. As many apparently widely different embodiments of this invention may be made without departing from the spirit and scope thereof, it is to be understood that I do not limit myself to the specific embodiments thereof except as defined in the appended claims.

I claim:

1. The process of preparing $C_2F_6$ which comprises reacting $C_2F_4$ with $SbF_5$ at a temperature from about 25° to about 98° C. and at a pressure between atmospheric and about 50 mm. mercury, condensing the vapors from the reaction, and separating the $C_2F_6$.

2. The process of preparing $C_2F_5Cl$ which comprises reacting $C_2F_3Cl$ substantially solely with $SbF_5$ at a temperature of about 95° C. and a pressure of from 500 to 700 mm. of mercury absolute, and separating the $C_2F_5Cl$.

3. The process of preparing a halogenated ethane in which at least two halogen atoms are fluorine which comprises reacting a halogenated ethylene containing at least three halogen atoms from the group consisting of fluorine and chlorine, with antimony pentafluoride at temperatures of from room temperature to 98° C., the halogenated ethylene and the antimony pentafluoride being the sole reactants, and separating the halogenated ethane.

ANTHONY F. BENNING.

REFERENCES CITED

The following references are of record in the file of this patent:

UNITED STATES PATENTS

| Number | Name | Date |
|---|---|---|
| 2,122,278 | Clark | June 28, 1938 |
| 2,146,725 | Dunphy | Feb. 14, 1939 |
| 1,677,831 | Krause | July 17, 1928 |
| 1,754,656 | Strosacker | Apr. 15, 1930 |

OTHER REFERENCES

Mellor, "Comprehensive Treatise on Inorganic and Theoretical Chemistry," vol. 9, pp. 467–9. (Copy in Div. 59.)

Ruff, "Berichte der Deutsche Chemische Gesellschaft," vol. 39, pages 4310–18 (1906). (Copy in Patent Office Scientific Library.)